(No Model.) 2 Sheets—Sheet 1.

F. H. FERRIS.
SEEDING MACHINE.

No. 507,796. Patented Oct. 31, 1893.

WITNESSES:
John W. Fisher
Walter Melius

INVENTOR,
Fred. H. Ferris
BY
Robt. W. Hardie
ATTORNEY.

(No Model.) 2 Sheets—Sheet 2.
F. H. FERRIS.
SEEDING MACHINE.
No. 507,796. Patented Oct. 31, 1893.
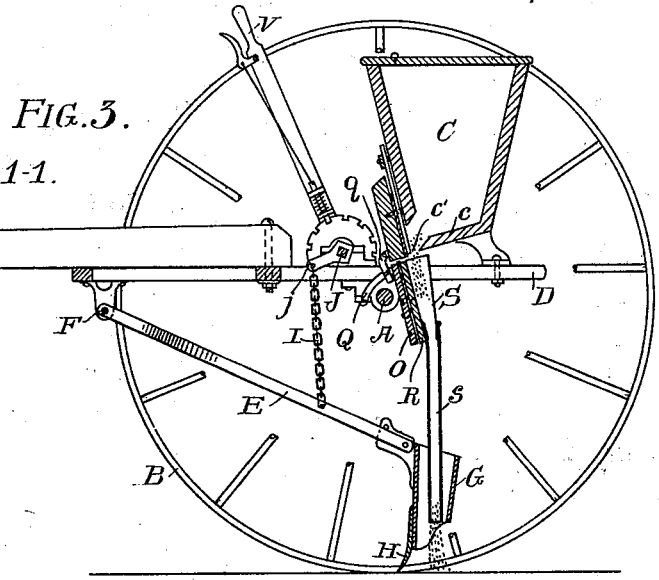
FIG. 3.
Sec. 1-1.
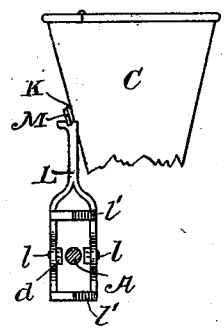
FIG. 5.
FIG. 6.
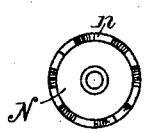
FIG. 7.
FIG. 8.
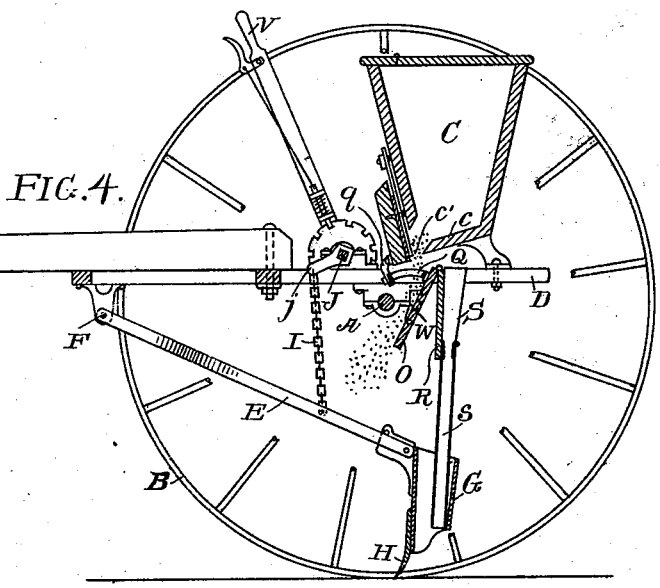
FIG. 4.
WITNESSES:
John W. Fisher
Walter Melius
INVENTOR,
Fred. H. Ferris
BY
Robert W. Hardie
ATTORNEY.

UNITED STATES PATENT OFFICE.

FRED H. FERRIS, OF KETCHUM'S CORNERS, NEW YORK.

SEEDING-MACHINE.

SPECIFICATION forming part of Letters Patent No. 507,796, dated October 31, 1893.

Application filed March 14, 1893. Serial No. 465,923. (No model.)

*To all whom it may concern:*

Be it known that I, FRED H. FERRIS, a citizen of the United States, residing at Ketchum's Corners, in the county of Saratoga and State of New York, have invented certain new and useful Improvements in Seeding-Machines; and I do hereby declare the following to be a full, clear, and exact description of the invention, such as will enable others skilled in the art to which it appertains to make and use the same.

My invention relates to seeding machines of the class known as grain drills and broadcast seeders, and has for its object to provide a machine which may be readily used either as a drill, or a broadcast seeder, at the will of the operator. In the devices heretofore used for this purpose, the seed has been delivered from the hopper on to the scattering board, and into the seed spouts, by means of cells or cups, or similar mechanism located within the hopper; consequently the seed is deposited on the scattering board in separate piles, on separate spots. The seed board does not, therefore, distribute the seed evenly on the ground. In my construction, however, the seed is delivered from the hopper evenly across the entire width of the hopper by means of a continuous slot, and is deposited uniformly on the scattering board, and is strewn by said board evenly on the ground. On the other hand, when the machine is used as a drill, the grain tubes are not fed by separate cups or cells located within the hopper, by the continuous stream of seed as it leaves the hopper is broken up by a series of discharge spouts arranged under the continuous opening in the hopper. This I accomplish by the means illustrated in the accompanying drawings, in which—

Figure 1:
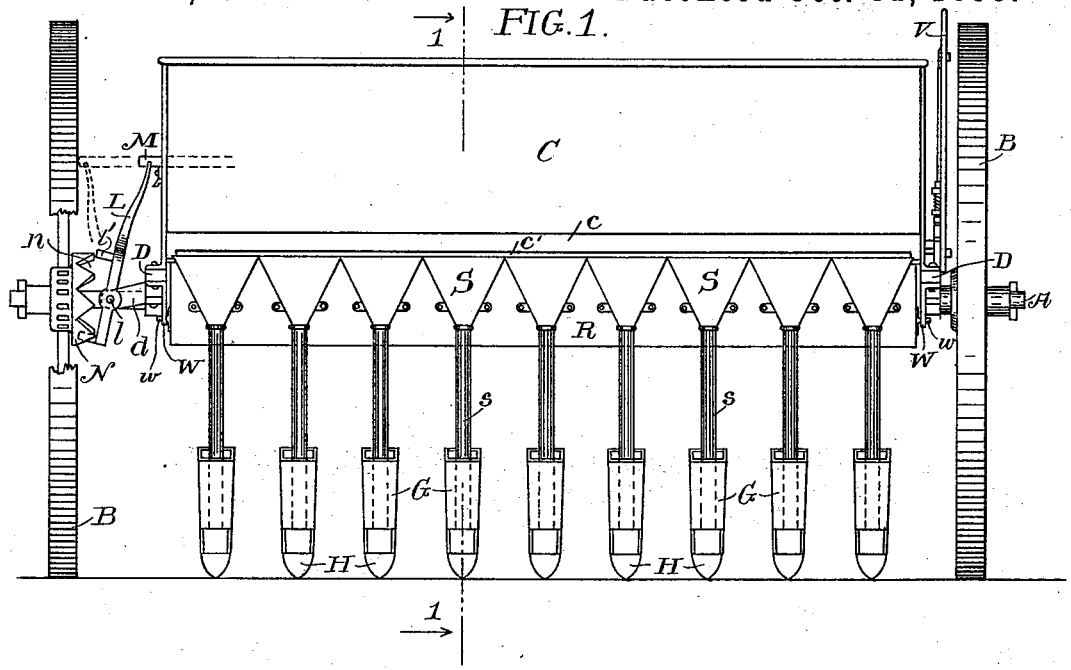
Figure 2:
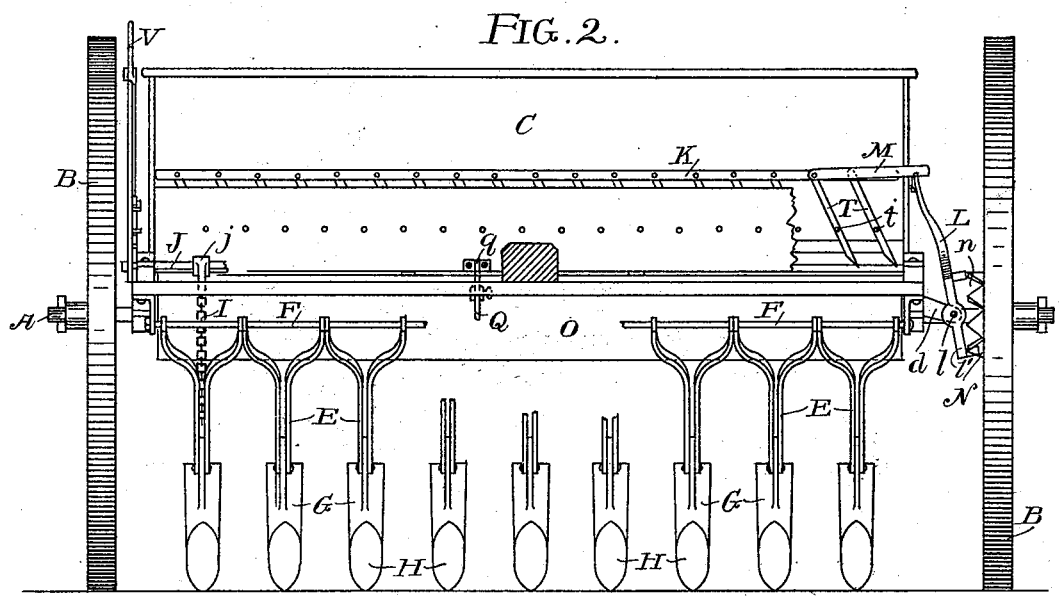

Figure 1 is a rear view of a machine embodying my inventions, and Fig. 2 is a front view of the same, partly in section. Fig. 3 is a vertical longitudinal section taken on line 1—1 of Fig. 1, showing the parts arranged for use as a drill. Fig. 4 is a vertical longitudinal section taken on line 1—1 of Fig. 1, showing the parts arranged for use as a broadcast seeder. Fig. 5 is a side view of a seed hopper and a pivoted lever. Fig. 6 is a plan view of the lever shown in Fig. 5. Fig. 7 is a plan view of a circular toothed rack. Fig. 8 is a side view of circular rack shown in Fig. 7.

As illustrated in the drawings, the carrying frame of the machine is of ordinary construction, and is supported on an axle A. mounted on wheels B. A seed hopper C. is secured to the frame bars D. The bottom $c$. of the hopper is slotted lengthwise at $c'$, and may be provided with a regulating slide of any suitable construction. A series of drag bars E. are pivoted at their forward ends to the cross bar F. and at their rear ends are provided with the ordinary drill boot G. and hoe H. These drag bars are provided with lifting chains I. connected to arms $j$. on the rock shaft J.

The seed hopper C. is provided on its inner side with a series of stirring fingers T. pivoted at $t$. and connected at their upper ends to the reciprocating bar K. which is connected to the upper end of the oscillating lever L. by means of the link M. The lever L. is pivoted to a bracket $d$, and is provided with teeth $l'$ above and below the pivotal point of the lever. Each tooth engages alternately with the inclined sides of the notches $n$ in the circular rack N, thereby giving a reciprocating movement to the upper end of said lever. A scattering board O. is arranged under the forward portion of the hopper, and is pivotally secured in any suitable manner to the main frame, as by the pivot $w$. supported by the arm W. shown in Fig. 1. By means of said pivotal bearings the inclination of the scattering board may be varied, when used as a broadcast, and the seed may thereby be scattered widely, or deposited on the ground closely together, as desired. I prefer to provide said board with a suitable locking device adapted to hold said board in position, such as the tongue Q. which engages the recessed lug $q$. provided with a set screw. A tail board R. is hinged to the scattering board O. at its upper edge, and is provided with a series of discharge spouts S. having drill tubes $s$. connected therewith and leading into the boots G.

When the machine is in operation, the inclined edges of the toothed rack N. bear against the lugs $l'$. of the lever L, and force said lugs alternately inward and outward, thereby giving a reciprocating movement to the upper end of the lever L. and to the bar K. which causes the lower ends of the stirring fingers T, to vibrate laterally in the delivery slot c'. at the bottom of the seed hopper, thereby causing the seed to pass freely out of said hopper.

When the discharge spouts S. are arranged under the slot c'. in the bottom of the hopper C. as shown in Fig. 3, the machine is adapted to be used as a drill; but when said spouts are moved backward as shown in Fig. 4, the scattering board O. is arranged under said slot and is inclined on its journals so as to scatter the seed broadcast in front of the hoes H.

Plaster and other fertilizing material may be sown broadcast by this machine, if desired.

What I claim is—

In a seeding machine, the combination of a seed hopper having a continuous delivery slot, an adjustable scattering board pivoted beneath said slot and a series of discharge spouts secured to a board hinged to said scattering board, and movable therewith substantially as shown and described.

In testimony whereof I affix my signature in presence of two witnesses.

FRED H. FERRIS.

Witnesses:
ROBERT W. HARDIE,
DANIEL ADLER.